(12) United States Patent
Held et al.

(10) Patent No.: US 7,932,306 B2
(45) Date of Patent: Apr. 26, 2011

(54) AMPHOTERIC DISPERSANTS AND THEIR USE IN INKJET INKS

(75) Inventors: Robert Paul Held, Newark, DE (US); C. Chad Roberts, Wilmington, DE (US); Patrick F. McIntyre, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 236 days.

(21) Appl. No.: 12/328,351

(22) Filed: Dec. 4, 2008

(65) Prior Publication Data
US 2010/0143590 A1    Jun. 10, 2010

Related U.S. Application Data

(60) Provisional application No. 61/007,409, filed on Dec. 12, 2007.

(51) Int. Cl.
*C09D 11/00* (2006.01)
(52) U.S. Cl. ........ 523/160; 523/161; 524/533; 524/555; 524/556; 347/100; 106/499
(58) Field of Classification Search .................. 347/100; 523/160, 161; 106/499; 524/533, 555, 556
See application file for complete search history.

(56) References Cited

U.S. PATENT DOCUMENTS

| | | | |
|---|---|---|---|
| 4,490,728 A | 12/1984 | Vaught et al. | |
| 5,022,592 A | 6/1991 | Zakheim et al. | |
| 5,026,427 A | 6/1991 | Mitchell et al. | |
| 5,085,698 A | 2/1992 | Ma et al. | |
| 5,272,201 A * | 12/1993 | Ma et al. ...................... | 524/505 |
| 5,310,778 A | 5/1994 | Shor et al. | |
| 5,519,085 A * | 5/1996 | Ma et al. ...................... | 524/503 |
| 5,648,405 A | 7/1997 | Ma et al. | |
| 5,679,138 A | 10/1997 | Bishop et al. | |
| 5,713,993 A * | 2/1998 | Grezzo Page et al. ..... | 106/31.85 |
| 5,734,403 A | 3/1998 | Sugar et al. | |
| 5,852,075 A | 12/1998 | Held | |
| 5,891,231 A | 4/1999 | Gnerlich et al. | |
| 5,976,232 A | 11/1999 | Gore | |
| 6,161,918 A | 12/2000 | Bailey et al. | |
| 6,354,693 B1 | 3/2002 | Looman et al. | |
| 6,648,463 B2 | 11/2003 | Koga et al. | |
| 2003/0089277 A1 | 5/2003 | Zakheim et al. | |
| 2005/0090599 A1 * | 4/2005 | Spinelli ........................ | 524/543 |
| 2006/0103704 A1 | 5/2006 | Hakamada et al. | |

FOREIGN PATENT DOCUMENTS

| | | |
|---|---|---|
| EP | 1125994 A1 | 2/1991 |
| EP | 0997506 A | 5/2003 |

* cited by examiner

*Primary Examiner* — David Wu
*Assistant Examiner* — Vu A Nguyen
(74) *Attorney, Agent, or Firm* — Angela Grayson; Dennis J. Morrell

(57) ABSTRACT

The present disclosure provides a black ink-jet ink, having a pH greater than 7, comprising a first aqueous vehicle, a carbon black pigment, and an amphoteric polymeric dispersant, wherein the amphoteric polymeric dispersant is a block copolymer comprising an A block and a B block, wherein the A block is a segment consisting essentially of an amine monomer; and the B block is a segment comprising an acidic monomer and at least one hydrophobic monomer; wherein the dispersant is neutralized, and with the proviso that the acid number is greater that the amine number, and the B block does not contain an amine monomer. The disclosure further pertains to an ink set comprising this black ink and at least a second ink which contains a reactive species with appropriate cationic agent, salt, or pH capable of destabilizing the carbon black dispersion. Still further, the disclosure pertains to a method of printing wherein the black ink and second ink are printed in an adjacent relationship, thereby minimizing penetration, feathering and/or bleed of the black pigment and improving print quality.

28 Claims, No Drawings

AMPHOTERIC DISPERSANTS AND THEIR USE IN INKJET INKS

CROSS-REFERENCE TO RELATED APPLICATION

This application claims priority from U.S. Provisional Application Ser. No. 60/007,409 (filed Dec. 12, 2007), the disclosure of which is incorporated by reference herein for all purposes as if fully set forth.

BACKGROUND OF THE DISCLOSURE

The present disclosure relates to an aqueous inkjet ink comprising carbon black pigment stabilized by a certain block copolymer dispersant. The disclosure further relates to an ink set comprising this ink and to a method of printing with the ink set.

Inkjet printing is a non-impact printing process in which droplets of ink are deposited on a substrate, such as paper, to form the desired image. The droplets are ejected from a printhead in response to electrical signals generated by a microprocessor.

Most inkjet printers are equipped with an ink set comprising two or more different inks and are able to print black text and multicolor images. Typically, an ink set will comprise at least a cyan, magenta and yellow colored ink and a black ink (CMYK ink set).

For printing text, it is desirable for the black ink to have high optical density. For this purpose, a pigment colorant is most advantageous, especially a carbon black pigment. A pigment colorant is not soluble in the ink vehicle and must be treated in order to cause it to remain dispersed and jet properly.

To effect dispersion stability, pigments are commonly treated with dispersants, and a wide variety of such materials have been disclosed. Especially effective are block copolymer dispersants which are described, for example, in U.S. Pat. Nos. 5,085,698, 5,519,085, 5,272,201, and 5,648,405. These patents disclose several types of diblock and triblock acrylic copolymers with amine and acidic monomers, such as N,N-dimethylaminoethyl methacrylate (DMAEMA) and methacrylic acid (MAA) monomers, incorporated in either the hydrophilic or hydrophobic block, but there is no disclosure of a block copolymer having a separate amine containing homo-block. Other copolymer dispersant examples include benzylmethacrylate (BZMA)//methacrylic acid (MAA) 13// 10 block copolymer with number average molecular weight (Mn) of 2966 disclosed in U.S. Pat. No. 5,852,075 and benzylmethacrylate (BZMA)//methacrylic acid (MAA) 13//3 block copolymer with number average molecular weight (Mn) of 2522 disclosed in U.S. patent publication US2005/ 0090599. Amphoteric (sometimes referred to as polyampholyte) dispersants, i.e., dispersants containing moieties capable of reacting with acidic and basic reagents, for improved dispersion stability, have also been described. For example, U.S. Pat. No. 5,648,405 discloses an amphoteric dispersant formed of MAA/DMAEMA/BzMA random copolymer, but there is no disclosure of amphoteric dispersants with block structures.

For CMYK ink sets comprising a pigment black ink, it is known to print the black ink in an adjacent relationship with one or more of the colored inks to improve the print quality of the black ink when the one or more colored ink(s) are formulated with an ingredient that destabilizes the black pigment dispersion for improved black-to-color bleed control and thus improved print quality. Such ink sets and printing method are disclosed for example in U.S. Pat. Nos. 5,734,403 and 6,354, 693, and in European Patent Publication 1,125,994 A1.

Despite the successful inkjet inks and print methods presently available, there is still a need for, and it is an objective of this disclosure to provide, inks and methods having even better print quality and jetting reliability.

SUMMARY OF THE DISCLOSURE

In a first aspect, the disclosure provides a black ink-jet ink, with pH greater than 7, comprising a first aqueous vehicle, a carbon black pigment, and an amphoteric polymeric dispersant, wherein the amphoteric polymeric dispersant is a block copolymer comprising an A block and a B block wherein the A block is a segment consisting essentially of an amine monomer, more typically an amine containing vinylic monomer, such as dimethylaminoethyl methacrylate; and the B block is a segment comprising an acidic monomer and at least one hydrophobic monomer, such as benzylmethacrylate, butylmethacrylate, etc.; wherein the dispersant is neutralized, and with the proviso that the acid number is greater than the amine number, and the B block does not contain an amine monomer.

In the first aspect, the block copolymer has a number average molecular weight (Mn) of between about 2000 and about 16,000 Daltons, more typically between about 3,000 and about 12,000 Daltons, and an acid number of between about 25 and about 220 (mg KOH to neutralize 1 gram of polymer solids), more typically between about 30 and about 200.

In the first aspect, the A block segment is 2 to 8 units of an amine monomer, and the B block is a segment comprising at least 6 units of acid monomer, and at least 16 units of at least one hydrophobic monomer.

In a second aspect, the disclosure provides an ink set comprising a first ink and a second ink, wherein the first ink is a black ink, with pH greater than 7, comprising a first aqueous vehicle, and a carbon black dispersion comprising a carbon black pigment, and an amphoteric polymeric dispersant; wherein the amphoteric polymeric dispersant is a block copolymer comprising an A block and a B block wherein the A block is a segment consisting essentially of an amine monomer, such as dimethylaminoethyl methacrylate; and the B block is a segment comprising an acidic monomer and at least one hydrophobic monomer, such as benzylmethacrylate, butylmethacrylate, etc.; wherein the dispersant is neutralized, and with the proviso that the acid number is greater than the amine number, and the B block does not contain an amine monomer; and said second ink comprises a second aqueous vehicle and reactive species with appropriate cationic agent, salt, or pH that can destabilize the carbon black dispersion of said first ink and typically the reactive species is structurally part of a colorant.

In a third aspect, the disclosure provides a method of inkjet printing on a substrate, comprising the steps of:

(a) providing an ink jet printer that prints in response to digital data signals;

(b) loading the printer with a substrate to be printed;

(c) loading the printer with an ink jet ink set comprising a first and second ink; and (d) printing said first and second ink on the substrate, in an abutting relationship to each other; wherein the first ink is a black ink, with pH greater than 7, comprising a first aqueous vehicle, and a carbon black dispersion comprising a carbon black pigment, and an amphoteric polymeric dispersant; wherein the amphoteric polymeric dispersant is a block copolymer comprising an A block and a B block wherein the A block is a segment consisting essentially of an amine monomer, such as dimethylaminoethyl methacrylate; and the B block is a segment comprising an acidic monomer and at least one hydrophobic monomer, such as benzylmethacrylate, butylmethacrylate, etc.; wherein the dispersant is neutralized, and with the proviso that the acid number is greater than the amine number, and the B block does not contain an amine monomer; and said second ink comprises a second aqueous vehicle and reactive species that can destabilize the carbon black dispersion of said first ink.

These and other features and advantages of the present disclosure will be more readily understood by those of ordinary skill in the art from a reading of the following detailed description. It is to be appreciated that certain features of the disclosure which are, for clarity, described above and below in the context of separate embodiments, may also be provided in combination in a single embodiment. Conversely, various features of the disclosure that are, for brevity, described in the context of a single embodiment, may also be provided separately or in any subcombination. In addition, references in the singular may also include the plural (for example, "a" and "an" may refer to one, or one or more) unless the context specifically states otherwise. Further, values stated in ranges include each and every value within that range.

DETAILED DESCRIPTION OF THE DISCLOSURE

Black Ink

The black ink comprises a first aqueous vehicle, a carbon black dispersion comprising a carbon black pigment and an amphoteric polymeric dispersant. Optionally the black ink further comprises other ingredients.

The ink vehicle is the liquid carrier (or medium) for the colorant(s) and optional additives. The term "aqueous vehicle" refers to a vehicle comprised of water or a mixture of water and one or more organic, water-soluble vehicle components commonly referred to as co-solvents or humectants. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

Examples of co-solvents that commonly act as penetrants include higher alkyl glycol ethers and/or an 1,2-alkanediols. Glycol ethers include, for example, ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. The 1,2-alkanediol penetrants include linear, for example, 1,2-(C5 to C8) alkanediols and especially 1,2-pentanediol and 1,2-hexanediol.

An aqueous vehicle will typically contain about 50% to about 96% water with the balance (i.e., about 50% to about 4%) being the water-soluble solvent/humectant.

Raw carbon black pigment is insoluble and non-dispersible in the ink vehicle and must be treated in order to form a stable dispersion. According to the present disclosure, the carbon black pigment is stabilized in the aqueous vehicle by treatment with an amphoteric polymeric dispersant which is a block copolymer comprising an A block and a B block wherein the A block is a segment consisting essentially of, more typically consisting only of, an amine monomer, more typically an amine containing vinylic monomer, such as dimethylaminoethyl(meth)acrylate, diethylaminoethyl(meth)acrylate, t-butylaminoethyl(meth)acrylate, vinyl pyridine, 4-aminostyrene, 4-(N,N-dimethylamino)styrene; and the B block is a segment comprising an acidic monomer and at least one hydrophobic monomer. Some suitable acidic monomers include methacrylic acid and acrylic acid, and some suitable hydrophobic monomers are selected from the group consisting essentially of benzyl methacrylate, butyl(meth)acrylate, methyl methacrylate, butyl methacrylate, ethylhexyl methacrylate, 2-phenylethyl methacrylate, ethyl acrylate, hydroxyethyl acrylate, butyl acrylate, and 2-phenylethyl acrylate.

The acid number of the amphoteric polymeric dispersant is greater than the amine number. Further, the B block does not contain an amine monomer. Typically, the A block segment is about 2 to about 8 units of an amine monomer, more typically about 3 to about 6 units of an amine monomer. The B block is a segment comprises at least about 6 units of acid monomer, more typically at least about 7 to about 11 units of acid monomer, and at least about 16 units of at least one hydrophobic monomer, more typically at least about 20 units of at least one hydrophobic monomer. Typically, the block copolymer has a number average molecular weight (Mn) of between about 2,000 and about 16,000 Daltons, more typically between about 3,000 and about 12,000 Daltons, and an acid number of between about 50 and about 220 (mg KOH to neutralize 1 gram of polymer solids), more typically between about 30 and about 200. Typically, the amine number is about 10 to about 180 mg KOH/g solids, more typically about 25 to about 100 mg KOH/g solids.

Typically, the amphoteric polymer dispersant is an AB, ABA or BAB block copolymer, although AB block copolymers with a homo-block of amine monomer is generally preferred.

The weight ratio of pigment to dispersant (P/D) is typically between about 0.5 and about 5. The acid groups on the dispersant polymer will typically be partially or completely neutralized with base to the salt form. Some examples of useful bases include alkali metal hydroxides (lithium, sodium, and potassium hydroxide), alkali metal carbonate and bicarbonate (sodium and potassium carbonate and bicarbonate), organic amines (mono-, di-, tri-methylamine, morpholine, N-methylmorpholine), organic alcohol amines (N,N-dimethylethanolamine, N-methyl diethanolamine, mono-, di-, triethanolamine), ammonium salts (ammonium hydroxide, tetra-alkyl ammonium hydroxide), and pyridine.

The amphoteric polymeric dispersant is present in the amount of about 0.3% to about 5.0%, more typically about 1.0% to about 2.5%, based on the total weight of the black ink.

Sources of carbon black pigment are well known to those of ordinary skill in the art. Likewise, methods of making block copolymers are known and include, for example, those methods described in U.S. Pat. Nos. 5,085,698 and 5,852,075, and U.S. patent publication US2005/0090599.

Controlled polymerization techniques such as Group Transfer Polymerization (GTP) or Reversible-Addition Fragmentation Transfer (RAFT) polymerization are typical because polymers produced thereby have precisely controlled molecular weight, block sizes and very narrow molecular weight distributions. These polymers typically have a polydispersity of less than about 2, generally in the range of about 1.0 to about 1.4. Polydispersity is the polymer weight average molecular weight (Mw) divided by its number average molecular weight (Mn). The dispersant polymers may be synthesized by established methods as described, for example, in U.S. Pat. Nos. 5,085,698 and 5,852,075 along with U.S. patent publication US2005/0090599, the disclosures of which are incorporated herein by reference.

To prepare the dispersion, the pigment and amphoteric polymeric dispersant are premixed. Typically the mixing device is a High Speed Disperser, which may be equipped with a Cowels type blade. The premixed pigment and amphoteric polymeric dispersant are then dispersed or deflocculated in a milling step. The premixture includes an aqueous carrier medium (such as water and, optionally, a water-miscible solvent) when the milling step involves a wet milling operation. The milling may be accomplished in a 2-roll mill, media mill, a horizontal mini mill, a ball mill, an attritor, or by passing an aqueous premix through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the amphoteric polymeric dispersant and the pigment under pressure. The media for the media mill is chosen from commonly available media, including zirconia, YTZ® (Nikkato Corporation, Osaka, Japan), and nylon. Typically the milled dispersion is filtered after the milling step. These various dispersion processes are in a general sense well-known in the art, as exemplified by U.S. Pat. Nos. 5,022,592, 5,026,427, 5,310,778, 5,891,231, 5,679,138, 5,976,232 and U.S. patent publication 2003/0089277. The pigment dispersion as made is typically in a concentrated form (dispersion concentrate), which is subsequently diluted with a suitable liquid containing the desired additives to make the final ink.

The range of useful particle sizes after dispersion is typically about 0.005 micron to about 15 micron. More typically, the pigment particle size should range from about 0.005 to about 5 micron and, most typically, from about 0.005 to about 1 micron. The average particle size as measured by dynamic light scattering is less than about 500 nm, more typically less than about 300 nm.

The levels of pigment employed in formulated inks are those levels needed to impart a desirable optical density to the printed image. Typically, pigment levels are in the range of about 0.01 wt % to about 10 wt %, and more typically from about 1 wt % to about 9 wt %.

Other ingredients, additives, may be formulated into the inkjet ink, to the extent that such other ingredients do not interfere with the stability and jettablity of the ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont). Surfactants are typically used in amounts up to about 5 wt % and more typically in amounts of no more than 2 wt %. Optionally, defoamers may be used to remove air entrapment that occurs during premixing and/or milling steps.

Polymers may be included in the ink as an additive to improve durability of printed image and/or enhance the printer performance of the inks. These polymers may be added to the ink up to about 10 wt %, with 5 wt % being typical depending on impact on performance. Suitable polymers include acrylic copolymers, polymer latexes from emulsion polymerization, and polyurethane dispersions. As with the dispersants mentioned herein before, polymer additives preferably originate from a controlled polymerization techniques such as Group Transfer Polymerization (GTP) or Reversible-Addition Fragmentation Transfer (RAFT) polymerization. Block copolymers are particularly useful for improving durability of the printed image while maintaining excellent print performance. Polymer additives can include the free addition of the same polymer used as the dispersant.

Biocides may be used to inhibit growth of microorganisms.

Pigmented ink jet inks typically have a surface tension in the range of about 20 $mN.m^{-1}$ to about 70 $mN.m^{-1}$ at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even, advantageously, less than about 3.5 mPa·s.

Method of Printing and Ink Sets:

Inkjet ink sets comprise at least two different inks which are used in combination to create the desired image. A typical printer will generally comprise at least four differently colored inks such as a cyan, magenta, yellow and black (CMYK) ink. Ink sets may further comprise one or more "gamut-expanding" inks, including different colored inks such as an orange ink, a green ink, a violet ink, a red ink and/or a blue ink, and combinations of full strength and light strengths inks such as light cyan and light magenta. In addition, ink sets may include one or more colorless inks which are printed in combination with the colored inks to enhance properties such as optical density, chroma, durability and/or gloss.

According to one embodiment of the disclosure, a method of ink jet printing onto a substrate is provided comprising, in any workable order, the steps of:

(a) providing an ink jet printer that is responsive to digital data signals;
(b) loading the printer with a substrate to be printed;
(c) loading the printer with an ink set comprising at least a first and second ink wherein said first ink is a black ink having a pH greater than 7, and comprises a first aqueous vehicle, and a carbon black dispersion comprising a carbon black pigment, and an amphoteric polymeric dispersant, wherein the amphoteric polymeric dispersant is a block copolymer comprising an A block and a B block, wherein the A block is a segment consisting essentially of an amine monomer; and the B block is a segment comprising an acidic monomer and at least one hydrophobic monomer; wherein the dispersant is neutralized, and with the proviso that the acid number is greater than the amine number, and the B block does not contain an amine monomer; and the second ink comprises a second aqueous vehicle and reactive species with appropriate cationic agent, salt, or pH that can destabilize the carbon black dispersion of said first ink; and (d) printing onto the substrate using the ink set, in response to the digital data signals, such that one or more regions of the substrate printed with said first ink are adjacent with said second ink.

The second ink can be colored or colorless. In a typical embodiment, the second ink is colored and most typically a cyan, magenta or yellow ink in a multicolor ink set. Typically, a colored second ink comprises a dye colorant which, by definition, is soluble in the ink vehicle. The second vehicle may be the same or different than the first vehicle and is subject to similar compositional considerations as that herein before described for the black ink.

The selection of colorant for the second ink is well understood by one skilled in the art, and should be reactive with the amine block of the defined dispersant. Some examples of useful dyes include (cyan) Acid Blue 9 and Direct Blue 199; (magenta) Acid Red 52, Reactive Red 180, Acid Red 37 and Reactive Red 23; and (yellow) Direct Yellow 86, Direct Yellow 132 and Acid Yellow 23. The preceding dyes are referred to by their "C.I." designation established by Society Dyers and Colourists, Bradford, Yorkshire, UK and published in The Color Index, Third Edition, 1971.

Some examples of useful pigments include Nipex® 180, Nipex® 160, Nipex® 150 and Printex® 80 which are available from Degussa which is part Evonik Industries AG located in Essen, Germany. The following table summarizes the properties of these carbon black pigments.

TABLE 1

Carbon Black Pigments

| Type | Primary Particle Size, nm | Surface Area | Oil Absorption | % Volatile |
|---|---|---|---|---|
| Nipex ® 180 | 15 | 260 | 160 | 4.5 |
| Nipex ® 160 | 20 | 150 | 150 | 4.5 |
| Nipex ® 150 | 29 | 110 | 115 | 7 |
| Printex ® 80 | 16 | 220 | 100 | 1.2 |

Reactive species in the second ink may include acid moieties such as sulfonic and carbonyl acid as part of the molecular structure of dyes or surfaces of pigments. The mechanism of bleed control results from the amine in the dispersant structure reacting with the acidic component in the second ink.

The inks of the present disclosure can be printed with any suitable inkjet printer, including printers equipped with piezo or thermal print heads. Some examples of thermal ink jet print heads are the Hewlett Packard Deskjet, and Canon iPIXMA iP4200, and some examples of piezo print heads are Brother MFC3360C, and Epson Stylus C120. Some suitable print heads are disclosed in U.S. Pat. No. 6,161,918, U.S. Pat. No. 4,490,728, and U.S. Pat. No. 6,648,463, the disclosures of which are incorporated herein by reference. The substrate can be any suitable substrate including plain paper, such as common electrophotographic copier paper; treated paper, such as photo-quality inkjet paper. The present disclosure is particularly advantageous for printing on plain paper.

The following examples illustrate the disclosure without, however, being limited thereto.

EXAMPLES

In the following examples, unless otherwise stated, water was deionized and ingredient amounts were in weight percent of the total weight of ink.

GLOSSARY

| | |
|---|---|
| Surfynol ® 465 | Surfactant from Air Products (Allentown, PA USA). |
| Proxel ™ GXL | Biocide from Avecia (Wilmington, DE, USA). |
| Glycereth-26 | 26 mole ethylene oxide adduct of glycerin. |

Polymeric Dispersants:

The dispersant polymers used to make the dispersions were synthesized by established methods as described, for example, in U.S. Pat. Nos. 5,085,698 and 5,852,075 along with U.S. patent publication US2005/0090599, the disclosures of which are incorporated by reference herein as if fully set forth.

It should be noted that, in referring to the polymer compositions, a double slash indicates a separation between blocks and a single slash indicates a random copolymer. Thus, BzMA//MAA//BzMA 8//10//8 is an ABA triblock polymer with a first A block that is on average 8 BzMA (Benzyl Methacrylate) units long, a B block that is on average 10 MAA (Methacrylic Acid) units long, and a final A block that is on average 8 BZMA units long.

Polymeric dispersants were routinely synthesized in dry THF and converted to a solution in 2-pyrrolidone (2P) by distilling the THF while replacing with 2P. In most cases, the dispersant was pre-dissolved at approximately 20% polymer solids in water with the aid of KOH to neutralized the acid moieties on the polymer.

The following synthetic examples were all based on group transfer polymerization (GTP), although other types of polymerization processes can be used to generate similar types of polymers. In the case of the block polymers, the current block was at least 95% converted before adding the mixture of monomers for the next block. In all cases, the feed cycle strategy is described. However, the synthesis was terminated when 99% of the monomer was converted as detected by HPLC with mesitylene as an internal standard. The molecular weight reported (unless otherwise noted) is based on theoretical considerations. For the random linear polymers, all monomer ratios reported as the mole ratios of the monomer components, and represent the theoretical degree of polymerization for each block or set of monomer units.

Standard laboratory techniques for handling water sensitive chemicals were employed for the following examples. For example, glassware was extensively dried before use, monomers were stored over sieves, and cannulation procedures were used to keep material dry.

Gel Permeation Chromatography or GPC was used to verify predicted molecular weight and molecular weight distribution. The GPC system was included a Waters 1515 Isocratic HPLC Pump, Waters 2414 Refractive Index Detector, 717 plus Waters Autosampler, Four Styregel Columns (HR 0.5, HR 1, HR 2, and HR 4) in series in a Waters Column Heater set to 40° C. Samples were eluted with Tetrahydrofuran (THF) at a flow rate of 1 mL/min. The samples were analyzed using Breeze 3.30 Software with a calibration curve developed from narrow molecular weight, polymethylmethacrylate (PMMA) standards. Based on light scattering data from Polymer Laboratories Ltd., the nominal, peak molecular weight for the PMMA standards was as follows: 300000, 150000, 60000, 30000, 13000, 6000, 2000, and 1000.

The particle size was determined by dynamic light scattering using a Microtrac Analyzer, Largo Fla. For many of the dispersion steps, a Model 100 F or Y, Microfluidics System was used (Newton Mass.).

thermocouple, N2 inlet, drying tube outlet, and addition funnels. Tetrahydrofuran (THF), 426.4 g, was cannulated to the flask. Initiator (dimethyl ketene methyl trimethylsilyl acetal), 16.8 g (0.0966 moles)) was injected followed by catalyst (tetrabutyl ammonium m-chlorobenzoate, 0.4 ml of a 1.0 M solution in acetonitrile). Catalyst solution (tetrabutyl ammonium m-chlorobenzoate, 0.3 ml of a 1.0 M solution in acetonitrile and THF, 10 g) was syringe pumped during both monomer feeds. Monomer feed I (N,N-dimethylaminoethyl methacrylate, 61.3 g (0.3904 mol)) was added over 15 minutes. After a 45 min. hold, HPLC indicated greater than 99% conversion, and then, monomer feed II (trimethylsilyl meth-

| Dispersant # | Polymer Structure | | Theor Mn | Theor Acid Number mg KOH/g polymer | Acid Value mEq/g polymer | Theor Amine Number mg KOH/g polymer | Amine Value mEq/g polymer |
|---|---|---|---|---|---|---|---|
| 1 | MAA//BZMA/MAA | 4//30/6 | 6226 | 99 | 1.77 | 0 | 0.00 |
| 2 | DMAEMA//BZMA/MAA | 4//30/11 | 6940 | 97 | 1.73 | 32 | 0.58 |
| 3 | DMAEMA//BZMA/MAA | 4//30/9 | 6768 | 83 | 1.48 | 33 | 0.59 |
| 4 | DMAEMA//BZMA/MAA | 4//30/7 | 6596 | 68 | 1.21 | 34 | 0.61 |
| 5 | DMAEMA//BMA/MAA | 4//30/6 | 5490 | 72 | 1.28 | 41 | 0.73 |
| 6 | DMAEMA//BZMA/BMA/MAA | 4//22.5/22.5/6 | 8385 | 47 | 0.83 | 27 | 0.48 |
| 7 | DMAEMA//MMA/BMA/MAA | 4//15/15/6 | 4860 | 81 | 1.44 | 46 | 0.82 |
| 8 | MAA//BZMA/MAA/DMAEMA | 4//30/6/5 | 7097 | 95 | 1.69 | 40 | 0.70 |
| 9 | MAA//BZMA/DMAEMA | 10//30/5 | 7011 | 88 | 1.57 | 40 | 0.71 |
| 10 | DMAEMA//BZMA/MAA | 8//30/9 | 7568 | 89 | 1.59 | 59 | 1.06 |

Dispersant 1: 4MAA//30BzMA/6MAA

A 3-liter round bottom flask was dried with a heat gun under nitrogen purge and equipped with a mechanical stirrer, thermocouple, N$_2$ inlet, drying tube outlet, and addition funnels. Tetrahydrofuran (THF), 426.4 g, was cannulated to the flask. Initiator (1,1-bis(trimethylsilyloxy)-2-methyl propene, 18.4 g (0.0793 moles)) was injected followed by catalyst (tetrabutyl ammonium m-chlorobenzoate, 0.5 ml of a 1.0 M solution in acetonitrile). Catalyst solution (tetrabutyl ammonium m-chlorobenzoate, 0.4 ml of a 1.0 M solution in acetonitrile and THF, 5 g) was syringe pumped during both monomer feeds. Monomer feed I (trimethylsilyl methacrylate, 50.5 g (0.3196 mol)) was added over 15 minutes. After 1 hr hold, HPLC indicated greater than 98% conversion, and then, monomer feed II (trimethylsilyl methacrylate, 75.1 g (0.4753 mol) and benzyl methacrylate, 416.4 g (2.3659 mol)) was added over 60 minutes while the reaction exothermed to 51° C.

The conversion by HPLC was greater than 99%, 1 hr after the feed was completed. 73 g of methanol were added, and then the THF and other volatile by-products were distilled by slowly heating to 120° C. while 2P was added. The final polymer solution was 48.9% solids with a measured acid value of 1.68 (milliequivalents/gram of polymer solids) based on total solids. The molecular weight of this polymer as measured by GPC was Mn 6484, Mw 7511, and P: D of 1.16.

Dispersant 2: 4DMAEMA//30BzMA/11MAA

A 3-liter round bottom flask was dried with a heat gun under nitrogen purge and equipped with a mechanical stirrer, acrylate, 168.9 g (1.0690 mol) and benzyl methacrylate, 509.6 g (2.8955 mol)) was added over 60 minutes while the reaction exothermed to 51° C.

The conversion by HPLC was greater than 97%, 1.5 hr after the feed was completed. 99 g of methanol were added, and then the THF and other volatile by-products were distilled by slowly heating to 120° C. while 2P was added. The final polymer solution was 45.2% solids with a measured acid value of 1.64 (milliequivalents/gram of polymer solids) based on total solids. The molecular weight of this polymer as measured by GPC was Mn 9938, Mw 12912, and P: D of 1.30.

Dispersant 3: 4DMAEMA//30BzMA/9MAA

A 3-liter round bottom flask was dried with a heat gun under nitrogen purge and equipped with a mechanical stirrer, thermocouple, N2 inlet, drying tube outlet, and addition funnels. Tetrahydrofuran (THF), 511.6 g, was cannulated to the flask. Initiator (1,1-bis(trimethylsilyloxy)-2-methyl propene), 18.5 g (0.1063 moles)) was injected followed by catalyst (tetrabutyl ammonium m-chlorobenzoate, 0.5 ml of a 1.0 M solution in acetonitrile). Catalyst solution (tetrabutyl ammonium m-chlorobenzoate, 0.4 ml of a 1.0 M solution in acetonitrile and THF, 10 g) was syringe pumped during both monomer feeds. Monomer feed I (N,N-dimethyl aminoethyl methacrylate, 66.9 g (0.4261 mol)) was added over 15 minutes. After a 15 min. hold, HPLC indicated greater than 99% conversion, and then, monomer feed II (trimethylsilyl methacrylate, 149.6 g (0.9468 mol) and benzyl methacrylate, 555.3 g (3.1551 mol)) was added over 60 minutes while the reaction exothermed to 52° C.

The conversion by HPLC was greater than 99%, 2 hr after the feed was completed. 95 g of methanol were added, and then the THF and other volatile by-products were distillated by slowly heating to 120° C. while 2P was added. The final polymer solution was 44.7% solids with a measured acid value of 1.40 (milliequivalents/gram of polymer solids) based on total solids. The molecular weight of this polymer as measured by GPC was Mn 8616, Mw 10746, and P: D of 1.25.

Dispersant 4: 4DMAEMA//30BzMA/7MAA

A 3-liter round bottom flask was dried with a heat gun under nitrogen purge and equipped with a mechanical stirrer, thermocouple, N2 inlet, drying tube outlet, and addition funnels. Tetrahydrofuran (THF), 497.6 g, was cannulated to the flask. Initiator (dimethyl ketene methyl trimethylsilyl acetal, 21.8 g (0.1253 moles)) was injected followed by catalyst (tetrabutyl ammonium m-chlorobenzoate, 0.6 ml of a 1.0 M solution in acetonitrile). Catalyst solution (tetrabutyl ammonium m-chlorobenzoate, 0.4 ml of a 1.0 M solution in acetonitrile and THF, 10 g) was syringe pumped during both monomer feeds. Monomer feed I (N,N-dimethylaminoethyl methacrylate, 77.3 g (0.4924 mol)) was added over 15 minutes. After a 15 min. hold, HPLC indicated greater than 98% conversion, and then, monomer feed II (trimethylsilyl methacrylate, 136.0 g (0.8608 mol) and benzyl methacrylate, 647.5 g (3.6376 mol)) was added over 60 minutes while the reaction exothermed to 53° C.

The conversion by HPLC was greater than 99%, 1 hr after the feed was completed. 96 g of methanol were added, and then the THF and other volatile by-products were distillated by slowly heating to 120° C. while 2P was added. The final polymer solution was 50.1% solids with a measured acid value of 1.10 (milliequivalents/gram of polymer solids) based on total solids. The molecular weight of this polymer as measured by GPC was Mn 7464, Mw 9221, and P: D of 1.24.

Dispersant 5: 4DMAEMA//30BzMA/6MAA

A 3-liter round bottom flask was dried with a heat gun under nitrogen purge and equipped with a mechanical stirrer, thermocouple, N2 inlet, drying tube outlet, and addition funnels. Tetrahydrofuran (THF), 424.7 g, was cannulated to the flask. Initiator (dimethyl ketene methyl trimethylsilyl acetal, 18.3 g (0.1052 moles)) was injected followed by catalyst (tetrabutyl ammonium m-chlorobenzoate, 0.5 ml of a 1.0 M solution in acetonitrile). Catalyst solution (tetrabutyl ammonium m-chlorobenzoate, 0.4 ml of a 1.0 M solution in acetonitrile and THF, 10 g) was syringe pumped during both monomer feeds. Monomer feed I (N,N-dimethylaminoethyl methacrylate, 66.6 g (0.4242 mol)) was added over 15 minutes. After a 15 min. hold, HPLC indicated greater than 99% conversion, and then, monomer feed II (trimethylsilyl methacrylate, 100.2 g (0.6342 mol) and benzyl methacrylate, 555.3 g (3.1551 mol)) was added over 60 minutes while the reaction exothermed to 57° C.

The conversion by HPLC was greater than 99%, 45 minutes after the feed was completed. 76 g of methanol were added, and then the THF and other volatile by-products were distillated by slowly heating to 120° C. while 2P was added. The final polymer solution was 49.5% solids with a measured acid value of 0.98 (milliequivalents/gram of polymer solids) based on total solids. The molecular weight of this polymer as measured by GPC was Mn 8336, Mw 11125, and P: D of 1.34.

Dispersant 6: 4DMAEMA//22.5BzMA/22.5BMA/6MAA

A 3-liter round bottom flask was dried with a heat gun under nitrogen purge and equipped with a mechanical stirrer, thermocouple, N2 inlet, drying tube outlet, and addition funnels. Tetrahydrofuran (THF), 560.6 g, was cannulated to the flask. Initiator (dimethyl ketene methyl trimethylsilyl acetal, 14.8 g (0.0851 moles)) was injected followed by catalyst (tetrabutyl ammonium m-chlorobenzoate, 0.4 ml of a 1.0 M solution in acetonitrile). Catalyst solution (tetrabutyl ammonium m-chlorobenzoate, 0.3 ml of a 1.0 M solution in acetonitrile and THF, 10 g) was syringe pumped during both monomer feeds. Monomer feed I (N,N-dimethylaminoethyl methacrylate, 80.4 g (0.4242 mol)) was added over 15 minutes. After 20 minute hold, HPLC indicated greater than 99% conversion, and then, monomer feed II (trimethylsilyl methacrylate, 80.4 g (0.5089 mol), butyl methacrylate, 268.9 g (1.8937 mol) and benzyl methacrylate, 333.2 g (1.8932 mol)) was added over 60 minutes while the reaction exothermed to 65° C.

The conversion by HPLC was greater than 99%, 1.5 hr after the feed was completed. 59.2 g of methanol were added, and then the THF and other volatile by-products were distillated by slowly heating to 120° C. while 2P was added. The final polymer solution was 45.8% solids with a measured acid value of 0.79 (milliequivalents/gram of polymer solids) based on total solids. The molecular weight of this polymer as measured by GPC was Mn 10763, Mw 13356, and P: D of 1.24.

Dispersant 7: 4DMAEMA//15MMA/15BMA/6MAA

A 3-liter round bottom flask was dried with a heat gun under nitrogen purge and equipped with a mechanical stirrer, thermocouple, N2 inlet, drying tube outlet, and addition funnels. Tetrahydrofuran (THF), 565.4 g, was cannulated to the flask. Initiator (dimethyl ketene methyl trimethylsilyl acetal, 15.3 g (0.0879 moles)) was injected followed by catalyst (tetrabutyl ammonium m-chlorobenzoate, 0.4 ml of a 1.0 M solution in acetonitrile). Catalyst solution (tetrabutyl ammonium m-chlorobenzoate, 0.3 ml of a 1.0 M solution in acetonitrile and THF, 10 g) was syringe pumped during both monomer feeds. Monomer feed I (N,N-dimethylaminoethyl methacrylate, 55.2 g (0.3516 mol)) was added over 15 minutes. After a 10 minute hold, HPLC indicated greater than 99% conversion, and then, monomer feed II (trimethylsilyl methacrylate, 83.2 g (0.5266 mol), butyl methacrylate, 280.1 g (1.9725 mol) and benzyl methacrylate, 346.9 g (1.9710 mol)) was added over 60 minutes while the reaction exothermed to 64° C.

The conversion by HPLC was greater than 99%, 1 hr after the feed was completed. 62.3 g of methanol were added, and then the THF and other volatile by-products were distillated by slowly heating to 120° C. while 2P was added. The final polymer solution was 49.6% solids with a measured acid value of 0.75 (milliequivalents/gram of polymer solids) based on total solids. The molecular weight of this polymer as measured by GPC was Mn 11813, Mw 14080, and P: D of 1.19.

Dispersant 8: 4MAA//30BzMA/6MAA/5DMAEMA

A 5-liter round bottom flask was dried with a heat gun under nitrogen purge and equipped with a mechanical stirrer, thermocouple, N2 inlet, drying tube outlet, and addition funnels. Tetrahydrofuran (THF), 1009.0 g, was cannulated to the flask. Initiator (1,1-bis(trimethylsilyloxy)-2-methyl propene, 35.0 g (0.1509 moles)) was injected followed by catalyst (tetrabutyl ammonium m-chlorobenzoate, 0.6 ml of a 1.0 M solution in acetonitrile). Catalyst solution (tetrabutyl ammonium m-chlorobenzoate, 0.6 ml of a 1.0 M solution in acetonitrile and THF, 11 g) was syringe pumped during both monomer feeds. Monomer feed I (trimethylsilyl methacrylate, 95.6 g (0.6051 mol)) was added over 15 minutes. After a 50 minute hold, HPLC indicated greater than 98% conversion, and then, monomer feed II (trimethylsilyl methacrylate, 144.5 g (0.9146 mol), benzyl methacrylate, 796.7 g (4.5267 mol) and N,N-dimethylaminoethyl methacrylate, 118.6 g (0.7554 mol)) was added over 60 minutes while the reaction exothermed to 64° C.

The conversion by HPLC was greater than 99%, 1.5 hr after the feed was completed. 110.8 g of methanol were added, and then the THF and other volatile by-products were distilled by slowly heating to 120° C. while 2P was added. The final polymer solution was 43.9% solids with a measured acid value of 1.58 (milliequivalents/gram of polymer solids) based on total solids. The molecular weight of this polymer as measured by GPC was Mn 7939, Mw 8754, and P:D of 1.10.

Dispersant 9: 10MAA//30BzMA/5DMAEMA

A 3-liter round bottom flask was dried with a heat gun under nitrogen purge and equipped with a mechanical stirrer, thermocouple, N2 inlet, drying tube outlet, and addition funnels. Tetrahydrofuran (THF), 588.9 g, was cannulated to the flask. Initiator (1,1-bis(trimethylsilyloxy)-2-methyl propene, 16.9 g (0.0728 moles)) was injected followed by catalyst (tetrabutyl ammonium m-chlorobenzoate, 0.4 ml of a 1.0 M solution in acetonitrile). Catalyst solution (tetrabutyl ammonium m-chlorobenzoate, 0.3 ml of a 1.0 M solution in acetonitrile and THF, 5 g) was syringe pumped during both monomer feeds. Monomer feed I (trimethylsilyl methacrylate, 114.2 g (0.7228 mol)) was added over 15 minutes. After a 60 minute hold, HPLC indicated greater than 97% conversion, and then, monomer feed II (benzyl methacrylate, 382.1 g (2.1710 mol) and N,N-dimethylaminoethyl methacrylate, 68.6 g (0.4369 mol)) was added over 60 minutes while the reaction exothermed to 51° C.

The conversion by HPLC was greater than 99% 1 hr after the feed was complete. 118 g of methanol were added, and then the THF and other volatile by-products were distilled by slowly heating to 120° C. while 2P was added. The final polymer solution was 45.7% solids with a measured acid value of 1.56 (milliequivalents/gram of polymer solids) based on total solids. The molecular weight of this polymer as measured by GPC was Mn 7019, Mw 8262, and P:D of 1.18.

Dispersant 10: 8DMAEMA//30BzMA/9MAA

A 3-liter round bottom flask was dried with a heat gun under nitrogen purge and equipped with a mechanical stirrer, thermocouple, N2 inlet, drying tube outlet, and addition funnels. Tetrahydrofuran (THF), 571.1 g, was cannulated to the flask. Initiator (1,1-bis(trimethylsilyloxy)-2-methyl propene, 24.4 g (0.1052 moles)) was injected followed by catalyst (tetrabutyl ammonium m-chlorobenzoate, 0.6 ml of a 1.0 M solution in acetonitrile). Catalyst solution (tetrabutyl ammonium m-chlorobenzoate, 0.5 ml of a 1.0 M solution in acetonitrile and THF, 10 g) was syringe pumped during both monomer feeds. Monomer feed I ((benzyl methacrylate, 558.5 g (3.1733 mol) and trimethylsilyl methacrylate, 150.4 g (0.9519 mol)) was added over 60 minutes while the reaction exothermed to 68° C. After a 60 minute hold, HPLC indicated greater than 99% conversion, and then, monomer feed II (N,N-dimethylaminoethyl methacrylate, 133.2 g (0.8484 mol)) was added over 15 minutes.

The conversion by HPLC was greater than 99%, 2 hr after the feed was completed. 68 g of methanol were added, and then the THF and other volatile by-products were distilled by slowly heating to 120° C. while 2P was added. The final polymer solution was 46.5% solids with a measured acid value of 1.49 (milliequivalents/gram of polymer solids) based on total solids.

Dispersion 1: Minimill Process, (M.M.):

Dispersion 1 was prepared using an Eiger Minimill media milling process described below.

A 900 gram dispersion sample was prepared by adding the following ingredients, in order, into a 1 Liter stainless steel pot. Each ingredient was added slowly with mixing using a High Speed Disperser equipped with a 60 mm Cowels type blade and operated at 1000 rpm. The pigment loading in the premix stage was 25%.

| Ingredients | Amount (g) |
| --- | --- |
| Deionized water | 123.6 |
| (MAA//BzMA/MAA, 4//30/6) | 146.4 |
| Nipex ® carbon black pigment | 90.0 |

After completing the pigment loading, the High Speed Disperser speed was increased to 3000 rpm and the ingredients were premixed for 2 hours.

Additional deionized water was then added to reduce pigment level to 20% prior to milling.

| Ingredients | Amount (g) |
| --- | --- |
| Deionized water | 90.0 |

Next, the dispersion was processed on the Eiger Minimill using a recirculation process at a flow-rate of 350 grams per minute for 4 hours. After completion of milling process, the final DI Water letdown was added to achieve the targeted 10% pigment loading in the final dispersion.

| Ingredients | Amount (g) |
| --- | --- |
| Deionized water | 450.0 |

The final dispersion had a total batch size of approximately 900 grams. This dispersion was filtered through a 3.0 micron Chipwich filter available from Pall Trincor of East Falls, N.Y. and collected in a 1000 ml polyethylene container. Samples of the dispersion were tested for pH, viscosity and particle size (D50 and D95) which are reported in the Table 2 below.

Dispersions 2-3, 9-12, and 16-21 were prepared using the above described Eiger Minimill media milling process using the dispersants, pigments, % pigment loading and P/D identified in Table 2 below.

Dispersion 4: Microfluidizer Process, (MF.)

Dispersion 4 was prepared using the Microfluidizer milling process outlined below:

A 900 gram dispersion sample was prepared by adding the following ingredients, in order, into a 1 Liter stainless steel pot. Each ingredient was added slowly with mixing using a High Speed Disperser, equipped with a 60 mm Cowels type blade, and operated at 1000 rpm. The targeted pigment loading in the premix stage was 23%.

| Ingredients | Amount (g) |
| --- | --- |
| Deionized Water | 139.7 |
| (DMAEMA//BzMA/MAA, 4//30/6) | 161.7 |
| Nipex ® carbon black pigment | 90.0 |

After completing the pigment loading, the High Speed Disperser speed was increased to 3500 rpm and the ingredients were premixed for 2 hours.

Next, additional DI water was added to reduce pigment loading to 15.0% which is the level used during milling.

| Ingredients | Amount (g) |
|---|---|
| Deionized Water | 208.7 |

The dispersion was milled for 12 passes at a flow rate of 350 ml/min and 15,000 psi through the Microfluidizer, that is a labscale model M-110Y High Pressure Pneumatic Microfluidizer, with a Z-Chamber available from Microfluidics of Newton, Mass. Additional Deionized water was added to further reduce the pigment loading to the targeted level of 10.0% pigment.

| Ingredients | Amount (g) |
|---|---|
| Deionized Water | 300 |

The dispersion was filtered through a 3.0 micron Chipwich filter and filled into a 1000 ml polyethylene container. The dispersion was tested for pH, viscosity, particle size (D50 and D95) which are reported in the Table 2 below.

Dispersions 5-8, 14, 15 and 22 were prepared using the above described Microfluidizer milling process using the dispersants, pigments, % pigment loading and P/D identified in Table 2 below.

| Ingredient | Weight % |
|---|---|
| Dispersion (as wt % pigment) | 4 |
| Diethyleneglycol | 3.6 |
| Glycerol | 3.4 |
| Trimethylolpropane | 3 |
| Glycereth-26 | 2 |
| Surfynol ® 465 | 0.5 |
| Proxel ™ GXL | 0.2 |
| Water (to 100%) | Balance |

Print Testing and Evaluation:

The black inks were printed with a Canon iPIXMA iP4200 (settings: plain media; normal print quality;). Standard cyan, magenta and yellow dye inks designated for that printer were used.

Line thickness patterns were printed with black line thickness of about 300-420 micrometers printed next to color inks. The reported values in the table of results with the black line on paper is shown as K/W, with the black line next to yellow ink is shown as K/Y and the black line next to two color red ink (yellow plus magenta inks) is shown as K/R. In the table of results the top and bottom black line edge Delta standard deviation for the three images are shown as K/W, K/Y and K/R, respectively. The lower the values, the better the inter-color bleed. The K/W values refer to feathering which is a different phenomena from inter color bleed.

TABLE 2

| Disp. | Dispersant Composition | | Pigment | % Pig | P/D | pH[1] | Viscosity (cps)[2] | D50[3] | D95[3] | Process |
|---|---|---|---|---|---|---|---|---|---|---|
| 1 | MAA//BzMA/MAA | 4//30/6 | Nipex ® 180 | 9.88 | 2.50 | 8.95 | 3.31 | 101 | 168 | M.M |
| 2 | MAA//BzMA/MAA | 4//30/6 | Nipex ® 180 | 9.95 | 3.00 | 8.10 | 3.10 | 104 | 183 | M.M |
| 3 | MAA//BzMA/MAA | 4//30/6 | Nipex ® 180 | 10.02 | 3.50 | 8.00 | 3.10 | 105 | 192 | M.M |
| 4 | DMAEMA//BMA/MAA | 4//30/6 | Nipex ® 180 | 11.70 | 2.00 | 9.98 | 3.78 | 117 | 187 | M.F. |
| 5 | DMAEMA//BMA/MAA | 4//30/6 | Nipex ® 180 | 11.41 | 2.50 | 9.83 | 3.27 | 112 | 166 | M.F. |
| 6 | DMAEMA//BzMA/MAA | 4//30/7 | Nipex ® 150 | 10.75 | 2.00 | 9.30 | 3.10 | 160 | 270 | M.F. |
| 7 | DMAEMA//BzMA/MAA | 4//30/9 | Nipex ® 160 | 10.05 | 2.50 | 9.97 | 2.48 | 127 | 212 | M.F. |
| 8 | DMAEMA//BzMA/MAA | 4//30/9 | Nipex ® 160 | 9.92 | 3.00 | 9.89 | 2.35 | 126 | 192 | M.F. |
| 9 | DMAEMA//BzMA/MAA | 4//30/11 | Nipex ® 180 | 10.01 | 2.50 | 8.93 | 3.40 | 92 | 149 | M.M |
| 10 | DMAEMA//BzMA/MAA | 4//30/11 | Nipex ® 160 | 9.73 | 2.50 | 8.80 | 2.60 | 95 | 163 | M.M |
| 11 | DMAEMA//BzMA/MAA | 4//30/11 | Nipex ® 160 | 9.81 | 3.00 | 8.80 | 2.70 | 96 | 176 | M.M |
| 12 | DMAEMA//BzMA/MAA | 4//30/11 | Printex ® 80 | 9.76 | 2.50 | 9.40 | 2.60 | 86 | 165 | M.M |
| 13 | DMAEMA//BzMA/MAA//DMAEMA | 4//30/11//4 | Nipex ® 150 | 9.94 | 2.50 | 9.09 | 2.27 | 171 | 243 | M.F. |
| 14 | DMAEMA//BzA/BMA/MAA | 4//22.5/22.5/6 | Nipex ® 150 | 11.21 | 2.00 | 9.06 | 3.00 | 171 | 273 | M.F. |
| 15 | DMAEMA//BzA/BMA/MAA | 4//22.5/22.5/6 | Nipex ® 150 | 10.69 | 2.50 | 9.29 | 2.58 | 181 | 287 | M.F. |
| 16 | MAA//BzMA/MAA/DMAEMA | 4//30/6/5 | Nipex ® 180 | 9.97 | 3.00 | 8.40 | 3.70 | 96 | 203 | M.M |
| 17 | MAA//BzMA/MAA/DMAEMA | 4//30/6/5 | Nipex ® 180 | 9.93 | 3.50 | 8.10 | 5.20 | 120 | 210 | M.M |
| 18 | MAA//BzMA/MAA/DMAEMA | 4//30/6/5 | Nipex ® 180 | 15.10 | 2.00 | 8.88 | 21.20 | 98 | 168 | M.M |
| 19 | MAA//BzMA/MAA/DMAEMA | 4//30/6/5 | Nipex ® 180 | 14.99 | 2.50 | 8.40 | 65.00 | 105 | 191 | M.M |
| 20 | MAA//BzMA/DMAEMA | 10//30/5 | Nipex ® 180 | 9.07 | 2.00 | 7.90 | 4.00 | 91 | 138 | M.M |
| 21 | MAA//BzMA/DMAEMA | 10//30/5 | Nipex ® 180 | 9.09 | 2.50 | 7.88 | 4.90 | 112 | 200 | M.M |
| 22 | DMAEMA//BzMA/MAA | 8//30/9 | Nipex ® 180 | 10.04 | 2.50 | 9.89 | 2.80 | 87 | 139 | M.F. |

[1]pH was measured using a model 511201 pH meter available from Beckman Coulter, Inc. of Fullerton, CA.
[2]Viscosity was measured using a model LVDV-II + Pro Brookfield Viscometer available from Brookfield Engineering Laboratories, Inc. of Middleboro, MA using a 00 Spindle and UL1 adapter.
[3]Particle size measurements were made using a Model NAS 35 Nanotrac Auto Sampler available from Microtrac Inc. of Largo, FL.

Ink Preparation:

Inks were prepared by stirring together the pigment dispersion and other ink ingredients according to the same general formulation summarized in the following table. The dispersion was added in an amount that provided 4% pigment solids in the final ink.

The measurements of the black line printed images were done with a device called "ImageXpert" manufactured by Imagexpert, Inc., Nashua, N.H. 03063.

Results:

The print test results for each ink are summarized in the Table 3.

TABLE 3

Print Test Results

| | Polymer Structure | P/D | Pigment | Line Thickness (microns) | | | Top & Bottom Edge Delta Std Dev (microns) | | |
|---|---|---|---|---|---|---|---|---|---|
| | | | | K/W | K/Y | K/R | K/W | K/Y | K/R |
| Control 1 | MAA/BZMA/MAA | 4//30/6 | 2.5 Nipex 180 | 424 | 448 | 461 | 11 | 47 | 54 |
| Control 2 | MAA/BZMA/MAA | 4//30/6 | 3.0 Nipex 180 | 458 | 605 | 476 | 10 | 51 | 55 |
| Control 3 | MAA/BZMA/MAA | 4//30/6 | 3.5 Nipex 180 | 415 | 575 | 510 | 8 | 65 | 54 |
| Ex 1 | DMAEMA//BZMA/MAA | 4//30/11 | 2.5 Nipex 180 | 455 | 458 | 466 | 19 | 19 | 22 |
| Ex 2 | DMAEMA//BZMA/MAA | 4//30/11 | 2.5 Nipex 160 | 467 | 474 | 458 | 22 | 23 | 23 |
| Ex 3 | DMAEMA//BZMA/MAA | 4//30/11 | 3.0 Nipex 160 | 472 | 482 | 469 | 23 | 22 | 27 |
| Ex 4 | DMAEMA//BZMA/MAA | 4//30/11 | 2.5 Printex 80 | 475 | 475 | 455 | 25 | 24 | 25 |
| Ex 5 | DMAEMA//BZMA/MAA | 4//30/9 | 2.5 Nipex 150 | 468 | 453 | 463 | 21 | 19.5 | 23 |
| Ex 6 | DMAEMA//BZMA/MAA | 4//30/9 | 2.5 Nipex 160 | 469 | 471 | 445 | 22 | 24 | 20 |
| Ex 7 | DMAEMA//BZMA/MAA | 4//30/9 | 3.0 Nipex 160 | 459 | 458 | 469 | 23 | 22 | 27 |
| Ex 8 | DMAEMA//BZMA/MAA | 4//30/7 | 2.0 Nipex 150 | 425 | 435 | 424 | 8.5 | 13 | 12.5 |
| Ex 9 | DMAEMA//BMA/MAA | 4//30/6 | 2.5 Nipex 180 | 339 | 330 | 336 | 6 | 8 | 11 |
| Ex 10 | DMAEMA//BMA/MAA | 4//30/6 | 3.0 Nipex 180 | 335 | 336 | 339 | 6 | 11 | 13 |
| Ex 11 | DMAEMA//BZMA/BMA/MAA | 4//22.5/22.5/6 | 2.0 Nipex 150 | 320 | 318 | 325 | 7 | 8 | 10 |
| Ex 12 | DMAEMA//BZMA/BMA/MAA | 4//22.5/22.5/6 | 2.5 Nipex 150 | 317 | 320 | 325 | 6 | 8 | 10 |
| Ex 13 | DMAEMA//BzMA/MAA | 8//30/9 | 2.5 Nipex 180 | 458 | 465 | 461 | 21 | 23 | 23 |
| Comp Ex 1 | MAA//BZMA/MAA/DMAEMA | 4//30/6/5 | 3.0 Nipex 180 | 440 | 479 | 487 | 17 | 40 | 34 |
| Comp Ex 2 | MAA//BZMA/MAA/DMAEMA | 4//30/6/5 | 3.5 Nipex 180 | 422 | 453 | 454 | 15 | 31 | 29 |
| Comp Ex 3 | MAA//BZMA/MAA/DMAEMA | 4//30/6/5 | 2.0 Nipex 180 | 441 | 474 | 494 | 16 | 31 | 37 |
| Comp Ex 4 | MAA//BZMA/MAA/DMAEMA | 4//30/6/5 | 2.5 Nipex 180 | 421 | 469 | 459 | 9 | 50 | 46 |
| Comp Ex 5 | MAA//BZMA/DMAEMA | 10//30/5 | 2.0 Nipex 160 | 385 | 531 | 521 | 9.5 | 63 | 56 |
| Comp Ex 6 | MAA//BZMA/DMAEMA | 10//30/5 | 2.5 Nipex 160 | 442 | 530 | 456 | 7.5 | 60 | 44 |

The table of print test results shows the polymer using no amine containing monomer in the structure (Control 1, 2 and 3) had the poorest standard deviation for the intercolor bleed, as indicated by the high K/Y and K/R values of top and bottom edge delta standard deviation that are 47-65 microns.

If the amine monomer is in the structure or block where it is incorporated into the hydrophobic and/or acid containing block, e.g. Comp Ex 1-6, the intercolor bleed has poorer values of top and bottom edge delta standard deviation shown as 31-63 microns, compared to the polymer structure with the amine in a distinct block (Examples 1-13), with values between 8-33 microns.

The values of the line thickness also demonstrates the reduced bleed of the defined dispersants, where the better bleed control has the K/W, K/Y and K/R line thickness values to be approximately the same for all three values, compared with the control and comparative examples that have greatly different values for the K/Y and K/R compared with the K/W value.

What is claimed is:

1. A black ink-jet ink, having a pH greater than 7, comprising a first aqueous vehicle, a carbon black pigment, and an amphoteric polymeric dispersant, wherein the amphoteric polymeric dispersant is a block copolymer comprising an A block and a B block, wherein the A block is a segment consisting essentially of an amine monomer; and the B block is a segment comprising an acidic monomer and at least one hydrophobic monomer; wherein the dispersant is neutralized, and with the proviso that the acid number is greater than the amine number, and the B block does not contain an amine monomer.

2. The black ink-jet ink of claim 1 wherein the amine monomer is selected from the group consisting essentially of dimethylaminoethyl (meth)acrylate, diethylaminoethyl (meth)acrylate, t-butylaminoethyl-(meth)acrylate, vinyl pyridine, 4-aminostyrene, and 4-(N,N-dimethylamino)-styrene.

3. The black ink-jet ink of claim 1 wherein the acidic monomer is methacrylic acid or acrylic acid.

4. The black ink-jet ink of claim 1 wherein the hydrophobic monomer is selected from the group consisting essentially of benzyl methacrylate, butyl(meth)acrylate, methyl methacrylate, butyl methacrylate, ethylhexyl methacrylate, 2-phenylethyl methacrylate, ethyl acrylate, hydroxyethyl acrylate, butyl acrylate, and 2-phenylethyl acrylate.

5. The black ink-jet ink of claim 1 wherein the block copolymer has a number average molecular weight (Mn) of between about 3,000 and about 16,000 Daltons.

6. The black ink-jet ink of claim 1 wherein the block copolymer has an acid number of between about 30 and about 220 (mg KOH to neutralize 1 gram of polymer solids).

7. The black ink-jet ink of claim 6 wherein the block copolymer has an acid number of between about 30 and about 200 (mg KOH to neutralize 1 gram of polymer solids).

8. The black ink-jet ink of claim 1 wherein the A block segment comprises 2 to 8 units of an amine monomer.

9. The black ink-jet ink of claim 1 wherein the B block comprises at least 6 units of acid monomer, and at least 16 units of at least one hydrophobic monomer.

10. The black ink-jet ink of claim 1 wherein the acid groups on the dispersant polymer are partially or completely neutralized with base to the salt form.

11. The black ink-jet ink of claim 10 wherein the base is selected from the group consisting essentially of alkali metal hydroxides, alkali metal carbonate, alkali metal bicarbonate, organic amines, organic alcohol amines, ammonium salts, and pyridine.

12. The black ink-jet ink of claim 1 wherein the amphoteric polymeric dispersant has an amine number of about 10 to about 180 mg KOH/g solids.

13. The black ink-jet ink of claim 1 wherein the amphoteric polymeric dispersant has a polydispersity of less than about 2.

14. The black ink-jet ink of claim 1 wherein the amphoteric polymeric dispersant is present in the amount of about 0.3% to about 5.0%, based on the total weight of the black ink.

15. An ink set comprising a first ink and a second ink wherein the first ink is a black ink having a pH greater than 7, and comprises a first aqueous vehicle, and a carbon black dispersion comprising a carbon black pigment, and an amphoteric polymeric dispersant, wherein the amphoteric polymeric dispersant is a block copolymer comprising an A block and a B block, wherein the A block is a segment consisting essentially of an amine monomer; and the B block is a segment comprising an acidic monomer and at least one hydrophobic monomer; wherein the dispersant is neutralized, and with the proviso that the acid number is greater than the amine number, and the B block does not contain an amine monomer; and the second ink comprises a second aqueous vehicle and reactive species that can destabilize the carbon black dispersion of said first ink.

16. The ink set of any claim 15 wherein the second ink further comprises a colorant.

17. The ink set of claim 16 wherein the colorant in the second ink is a dye.

18. The ink set of claim 15 wherein the amine monomer is selected from the group consisting essentially of dimethylaminoethyl (meth)acrylate, diethylaminoethyl(meth)acrylate, t-butylaminoethyl-(meth)acrylate, vinyl pyridine, 4-aminostyrene, and 4-(N,N-dimethylamino)-styrene.

19. The ink set of claim 15 wherein the acidic monomer is methacrylic acid or acrylic acid.

20. The ink set of claim 15 wherein the hydrophobic monomer is selected from the group consisting essentially of benzyl methacrylate, butyl(meth)acrylate, methyl methacrylate, butyl methacrylate, ethylhexyl methacrylate, 2-phenylethyl methacrylate, ethyl acrylate, hydroxyethyl acrylate, butyl acrylate, and 2-phenylethyl acrylate.

21. The ink set of claim 15 wherein the block copolymer has a number average molecular weight (Mn) of between about 3,000 and about 16,000 Daltons.

22. The ink set of claim 15 wherein the block copolymer has an acid number of between about 50 and about 220 (mg KOH to neutralize 1 gram of polymer solids).

23. The ink set of claim 15 wherein the reactive species is a cationic agent, salt, or pH.

24. The ink set of claim 15 wherein the reactive species is part of the molecular structure of the colorant.

25. A method of ink jet printing onto a substrate comprising, in any workable order, the steps of:
(a) providing an ink jet printer that is responsive to digital data signals;
(b) loading the printer with a substrate to be printed;
(c) loading the printer with an ink set comprising at least a first and second ink wherein said first ink is a black ink having a pH greater than 7, and comprises a first aqueous vehicle, and a carbon black dispersion comprising a carbon black pigment, and an amphoteric polymeric dispersant, wherein the amphoteric polymeric dispersant is a block copolymer comprising an A block and a B block, wherein the A block is a segment consisting essentially of an amine monomer; and the B block is a segment comprising an acidic monomer and at least one hydrophobic monomer; wherein the dispersant is neutralized, and with the proviso that the acid number is greater than the amine number, and the B block does not contain an amine monomer; and the second ink comprises a second aqueous vehicle and reactive species that can destabilize the carbon black dispersion of said first ink; and
(d) printing onto the substrate using the ink set, in response to the digital data signals, such that one or more regions of the substrate printed with said first ink are adjacent with said second ink.

26. An ink jet printer comprising the black ink-jet ink of claim 1.

27. An ink jet printer comprising the ink set of claim 15.

28. The black ink-jet ink of claim 1 wherein the A block is a segment consisting of an amine monomer.

* * * * *